United States Patent Office 3,540,928
Patented Nov. 17, 1970

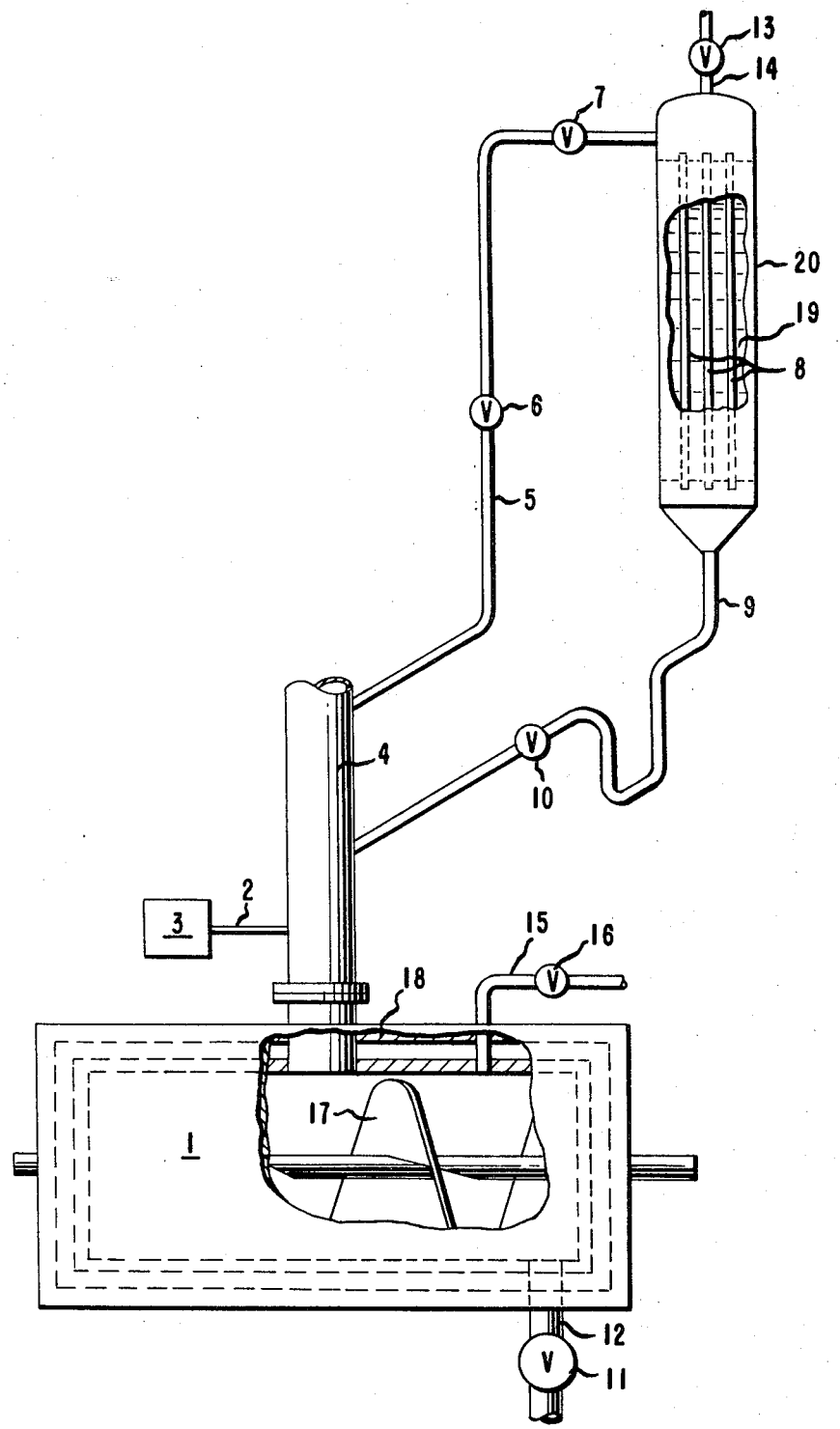

3,540,928
REMOVING AMMONIUM CHLORIDES FROM TML PRODUCTION EQUIPMENT
Derek Bryce-Smith, Reading, Berkshire, England, assignor to E. I. du Pont de Nemours and Company, Wilmington, Del., a corporation of Delaware
Filed June 28, 1968, Ser. No. 741,005
Int. Cl. B08b 9/00, 5/00
U.S. Cl. 134—22       10 Claims

ABSTRACT OF THE DISCLOSURE

Removal of solid deposits of ammonium chlorides from methylation equipment utilized for manufacture of tetramethyl lead by ammonia or amine catalyzed reaction of methyl chloride and sodium lead alloy including the steps of (A) causing sufficient ammonia vapor to condense on components of the equipment to effectively remove substantial portions of said deposits; (B) collecting the ammonia and removed deposits in an area where convenient removal is possible; and (C) removing the ammonia and collected deposits.

---

This invention relates to the manufacture of tetramethyl lead by the ammonia or amine catalyzed methylation of sodium lead alloy with methyl chloride, in particular to an improved method for removing ammonia chlorides, such as ammonium chloride itself and organic ammonium chlorides which chlorides are deposited in the methylation equipment as a result of side reactions between the ammonia or the amines and the methyl chloride.

BACKGROUND OF THE INVENTION

Ammonia and certain amines along or together with selected cocatalysts are superior to conventional aluminum type catalysts for the methyl chloride methylation of sodium lead alloy to tetramethyl lead (see, e.g., Pedrotti et al., U.S. Pat. No. 3,281,442). The methylation is initiated rapidly and brought to completion smoothly and rapidly under mild conditions. Temperatures are lower and reaction times shorter, while yields of tetramethyl lead are as large or larger than with the conventional aluminum type catalysts.

Despite the improvements provided by these novel catalysts, a problem remains. The ammonia or the amines react with the methyl chloride to form solid ammonium chlorides as by-products, i.e., either ammonium chloride itself or organic ammonium chlorides. These chlorides deposit in the interior of the methylation equipment. Such deposits cause little or no trouble in an area of the equipment where byproduct solids such as lead sludge and sodium chloride normally accumulate. The equipment is designed for removal of solids from such an area. However, especially with ammonia, the more volatile catalytic amines, the volatile methyl chloride and the catalysts tend to react in vapor spaces of the equipment. Thus, the chlorides accumulate in methyl chloride reflux condensers, in lines to and from such condensers, in lines leading to pressure actuated, process control devices or instruments, in valves in such lines and in like places in the equipment. Eventually deposition begins to interfere with efficient heat transfer in condensers, the valves become difficult to operate and process control devices become slow to respond or unresponsive to pressure changes.

When, after a varying number of production cycles, the problem becomes severe enough to threaten production or production control, the methylation equipment must be shut down for removal of the chlorides by water washing.

Water washing is deficient in several respects. It is costly in terms of labor and production down-time. Washing is frequently incomplete because of limited access of water to small lines or closely spaced parts such as, for example, valve components. A major drawback to water washing is in the requirement for thoroughly drying the equipment before resumption of production. The thorough drying is a time consuming step adding to down-time. Water in small, controlled quantities often promotes ammonia or amine catalysis, but in larger quantities water severely inhibits the desired methylation.

It is therefore among the objects of this invention to provide an improved method for removing deposits of ammonium chlorides from methylation equipment utilized in the production of tetramethyl lead by the ammonia or the amine catalyzed methylation of sodium lead alloy with methyl chloride. Another object is such a method providing more complete removal of the deposits from the equipment. Still another object is the elimination of the use of water washing for said removal and thereby elimination of the need for equipment drying.

SUMMARY OF THE INVENTION

In a process for removing solid deposits of ammonium chlorides from methylation equipment utilized for the manufacture of tetramethyl lead by ammonia or amine catalyzed reaction of methyl chloride and sodium lead alloy, the improvement of the subject invention includes the steps of:

(A) Causing sufficient ammonia vapor to condense to liquid ammonia on components of the equipment where the deposits are accumulated to effect substantially complete removal of such deposits therefrom;

(B) Collecting the deposits removed by the ammonia in an area of the equipment where convenient removal is possible; and (C) Removing the ammonia and the solid deposits from the collection area.

The ammonia vapor is preferably provided by refluxing liquid ammonia from a lower area of the equipment and the collection is preferably effected by gravity return of a liquid ammonia solution or slurry of the deposits to the lower area.

From the lower area, ammonia may be removed by revaporation thus leaving behind the substantially non-volatile solid ammonium chlorides which may be removed, e.g., by mechanical means.

A normally liquid hydrocarbon may also be added to the equipment in sufficient quantity to form a mobile, more easily removable slurry with the deposits. The preferred hydrocarbon is toluene.

BRIEF DESCRIPTION OF DRAWING

The drawing represents schematically a simplified diagram of typical methylation equipment with which the subject invention may be utilized.

DETAILED DISCUSSION OF INVENTION

Methylation equipment

By methylation equipment is meant any reactor, together with auxiliary apparatus, suitable for preparing tetramethyl lead by the ammonia or the amine catalyzed reaction represented by the following equation.

$$4CH_3Cl + 4NaPb \xrightarrow{catalyst} (CH_3)_4Pb + 4NaCl + 3Pb$$

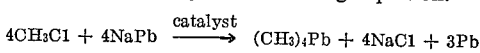

Most usually the reactor comprises an agitatable pressure vessel. The auxiliary apparatus includes reactor heating and cooling means, means for charging the reactor, a means of discharging the reactor, a reflux condenser for condensing vaporized methyl chloride, a methyl chloride vapor line to the condenser from the reactor, a methyl chloride condensate return line from the condenser to the reactor and flow control valves in such lines. Other auxiliary devices may include process control devices operably connected to pressure sensing units which units are, in turn, operably connected by lines to the interior of the equipment.

Such equipment may vary in capacity from small laboratory alkylation equipment to commercial alkylation equipment such as is described, for example, by Mitchell et al. in U.S. Pat. No. 2,411,453. It will be appreciated that equipment suitable for the above described methylation includes batch, semi-continuous or continuous production equipment.

Ammonium chlorides

As discussed above, side reactions between catalyst ammonia or the catalyst amines and methyl chloride produce solid ammonium chlorides represented by the formula R R' R'' R''' NCl, wherein, R, R', R'', and R''' may all be hydrogen atoms as in ammonium chloride, mixtures of hydrogen atoms and organic radicals or all organic radicals as, for example, in the tetramethyl ammonium chloride resulting from complete methylation of ammonia by methyl chloride. The deposition of such chlorides as solids, especially in the above described lines, valves and methyl chloride condenser, interferes with the ease of valve operation, plugs lines to pressure sensing units and renders heat transfer inefficient in the condenser. Tetramethyl lead productivity, production control and safety are jeopardized. Thus, after a varying number of tetramethyl lead production cycles a shut-down for deposit removal is indicated by deterioration of heat transfer in the condenser, by increasing difficulty in valve operation and by sluggishly responsive or inoperative pressure sensing units.

Process of the invention

Broadly the process of this invention includes the following steps or events which follow a routine discharging from the methylation equipment of tetramethyl lead, excess methyl chloride, lead sludge, sodium chloride and other byproducts, e.g., gaseous side reaction products.

(1) Ammonia vapor is condensed on the surfaces of the affected parts of the equipment, that is, on the deposit bearing surfaces of the lines, of the condenser and of the valves. Sufficient ammonia is used to affect both the condensation to liquid ammonia and to afford a mobile solution or slurry of the chlorides in the liquid ammonia. Condensation on such surfaces is effected by maintaining said surfaces at a temperature below that required to maintain the ammonia vapor pressure within apparatus limitations. A mobile liquid or slurry is provided by using sufficient ammonia.

(2) The condensing ammonia dissolves, or partially dissolves and loosens, the solid ammonium chlorides. The resulting solution or mobile slurry is conducted by any suitable means, such as by gravity flow, to one area of the equipment.

(3) The process is continued until substantially all the deposits are removed from the affected parts and are concentrated in the desired area, from which area ammonia and solid chlorides are removed by a suitable means, for example, by evaporation of the ammonia and by mechanical removal of the solid ammonium chlorides.

Broadly this process is operable over the liquid range of ammonia, i.e., from below the critical point (132.3° C., at an absolute equilibrium vapor pressure of 111.3 atmospheres) to above the freezing point (about −17° C., at an equilibrium vapor pressure of about 0.06 atmosphere). However, for practical reasons of economics and safety, one would operate at ammonia vapor pressures lower than the maximum design pressure of the equipment. Operating in a temperature range where costly refrigeration is required is seldom practical and usually unnecessary.

Very effective results are obtained by using refluxing ammonia and condenser cooling with a flow of process water which neither has to be heated nor refrigerated, cooling the lines and valves by exposure to air at the ambient area temperature, and heating ammonia for reflux by a flow of hot water or low pressure steam to a heating jacket of the reactor.

The deposit problem and the application of an embodiment of the process of this invention in overcoming the problem may be visualized by reference to the drawing which represents schematically a simplified diagram of a well known type of methylation equipment. The equipment basically includes methylation autoclave 1 and auxiliary apparatus 2 to 20. Illustratively, deposits of the ammonium chlorides accumulate in line 2 terminating in and sealed by pressure sensing unit 3, in charging leg 4, in methyl chloride vapor line 5, in vapor flow control valves 6 and 7, in condenser tubes 8, in methyl chloride condensate return line 9 and in condensate flow control valve 10.

The deposit removal process is initiated, following routine discharge of tetramethyl lead product, excess reagent and byproducts, by closing discharge valve 11 in discharge leg 12, a charging valve (not shown) in leg 4 and valve 13 in methyl chloride vent line 14. Valves 6, 7 and 10 are opened or are allowed to remain open. Ammonia, in quantity sufficient to provide from about 1 to about 3 times the equipment volume of ammonia vapor, at the equipment temperature, is now admitted under pressure to the equipment via line 15. Valve 16 is closed, effectively sealing the equipment. Valve 13 is opened and the ammonia pressure in the equipment is vented until the equipment is essentially at atmospheric pressure. The purpose of this purge is to replace with ammonia vapor most of the residual gas, for example, the nitrogen commonly used to fill the equipment following a tetramethyl lead production cycle. The diluting effect of large quantities of such as gas on ammonia vapor tends to interfere with efficient ammonia condensation in the ensuing process.

Valve 13 is closed again and more ammonia is admitted via line 15. Valve 16 is closed. This time, at least sufficient ammonia is employed to provide liquid ammonia in the autoclave 1 at a planned or preselected autogenous operating pressure or temperature in the autoclave. Agitation is started by rotating the so called plow agitator 17 and heat is applied to the autoclave by admitting steam to the autoclave jacket 18. Refluxing of ammonia is thereby established. Ammonia condenses in those parts of the equipment which are relatively cooler than interior parts of the autoclave. Illustratively condensation occurs on the interior surface of pressure line 2, in leg 4, in line 5, in valves 6 and 7, in tubes 8, in line 9 and in valve 10. The condensing liquid ammonia dissolves, or partially dissolves the chloride deposits, thereby loosening undissolved deposits. The resulting solution or slurry returns by natural gravity flow to the interior of the autoclave from where ammonia is revaporized leaving the nonvolatile ammonium chlorides in the autoclave. Condensation of ammonia vapor in the condenser tubes 8 is facilitated by a flow of coolant fluid 19, e.g., cold water, in condenser jacket 20. The process is continued until substantially all the chlorides are removed from the above enumerated parts of the equipment. Completion of the process is indicated, for example, by leveling off of ammonia vapor pressure in the condenser tubes 8 and a return to operability of pressure sensing device 3. A relatively simple alternate determination of process completion comprises occasional sampling of the condensate at a sealable line (not shown) near the lower end of leg 4. When the condensate so sampled evaporates and leaves no solid residue, the deposit removal process is complete. Next, the ammonia is vented from the equipment by opening valve 13. When the internal pressure reaches atmospheric pressure, discharge valve 11 is opened and agitator 17 so rotated as to push the chlorides into discharge leg 12, from which leg the deposits are discharged. Lastly, the equipment is purged free of ammonia vapor by admitting an inert gas such as nitrogen under pressure via discharge leg 12 or via line 15. The progress and the completion of the purging may be monitored by well known chemical tests for ammonia vapor, for example, at the exit of line 14. Following the purge, heating and agitation are terminated and the equipment is substantially ready for resumption of tetramethyl lead production. The purge is required because uncontrolled and unknown amounts of residual ammonia in the equipment, when added to a controlled amount of ammonia used for catalysis, can cause excessively rapid, even runaway methylation.

In a preferred embodiment of this invention, a normally liquid hydrocarbon is added to the autoclave prior to the first addition of ammonia. The hydrocarbon, such as benzene, toluene, xylene, kerosine or the like, is added in sufficient quantity to form a mobile slurry with the deposits to be collected. The addition of such a hydrocarbon offers important advantages. More facile deposit discharge and more complete discharge are achieved. Granulation of the chlorides under agitation is more complete and lumping or caking of the chlorides is reduced. Agitation is also eased. The addition of an internal agitator lubricant, such as graphite in amounts used for methylation, further eases agitator rotation.

It will be immediately apparent that a suitable quantity of ammonia for deposit removed will depend on equipment design, interior volume, surface area, temperature or pressure desired during operation of the process, on desired reflux rate or deposit removal speed and on like factors. The most suitable quantity of ammonia is best determined by actual effectiveness trials in specific equipment. However, an approximation of the ammonia quantity can be obtained by dividing the equipment volume by the orthobaric volume of ammonia vapor at the autoclave temperature or at the autoclave pressure at which the process will be conducted. What is required is return flow of the solution or the slurry into the autoclave at least far enough so that the agitator can scrape the deposits into the autoclave. Thus, liquid is desired in the autoclave. If, for example, the interior temperature of the autoclave is to be 50° C. during the process, the orthobaric vapor volume of ammonia at 50° C. is about 63.4 liters per kilogram. One divides the equipment volume in liters by 63.4 to obtain the desired amount of ammonia in kilograms. In actual practice, from about 0.6 to about 6 times the approximated quantity of ammonia has been found effective in a standard, horizontal autoclave with conventional auxiliary apparatus, which autoclave has a capacity of about 2600 liters and the auxiliary apparatus a capacity of about 600 liters.

It will be appreciated that ammonia is the preferred material for this invention. Because the atmospheric pressure density of ammonia vapor is substantially less than that of, for example, nitrogen, ammonia is easily displaced from the equipment by nitrogen or even by air. However, other easily condensable gaseous materials such as methyl amine may be utilized. Care must be used, however, in choosing a material traces of which do not interfere with methylation, that dissolves the ammonium chlorides and that does not react adversely with materials of construction, for example, with the carbon steels used in fabricating most commercial methylation equipment.

The quantity of normally liquid hydrocarbon is also best chosen by trial. In the 3200 liter equipment above from about 25 to about 200 kilograms of toluene are effective.

When other amine catalysts such as methyl amine are utilized to effect methylation, the ammonia process of this invention is also very effective for deposit removal. Although ammonia is also effective for removal of the chlorides of 2-methoxyethylamine and ethylenediamine, also methylation catalysts, these latter amines have a lesser tendency to foul the overhead equipment than does ammonia or methyl amine. They are much less volatile under methylation conditions and, thus, are less available for vapor space reaction and deposit formation.

EXAMPLES

The following examples serve to more fully illustrate the process, methods of conducting the process and the advantages thereof.

Example 1

In this example a standard, horizontal, plow-agitated, jacketed, steel methylation autoclave of about 2600 liters capacity is employed. The methyl chloride condenser has a tube interior volume of about 490 liters; lines between autoclave and condenser have a capacity of about 140 liters. Thus, the equipment has about 3230 liters total capacity.

After 30 to 50 tetramethyl lead production cycles, increased methyl chloride pressure in the methyl chloride condenser indicates loss of heat transfer capacity in the condenser. Manual operation of the valves in the lines between the autoclave and the condenser is found to be very difficult. Valves in lines to pressure sensing units are also found hard to operate, indicating incipient plugging of said lines and valves.

Product and byproducts are removed from the equipment in routine fashion and the deposit removal process is initiated.

About 45 kilograms (kg.) of toluene and about 9 kg. of comminuted graphite are added to the autoclave with the auotclave interior temperature at about 25° C. A flow of coolant water, at from about 1° C. to about 25° C., is initiated in the methyl chloride condenser. Agitation is started and about 22 kg. of ammonia are admitted under pressure to the autoclave, the autoclave and overhead apparatus being sealed. The ammonia is then vented to the atmosphere by a methyl chloride vent line until the internal pressure in the equipment reaches atmospheric pressure. Next about 125 kg. of ammonia are admitted under pressure to the equipment and the equipment is sealed. Steam is admitted to the autoclave jacket and the ammonia is refluxed for 1 hour at about 11.5 atmospheres absolute pressure in the autoclave, i.e., at an autoclave internal temperature of about 30° C. During the refluxing, the several valves in the lines are manually operated several times to assure access of ammonia vapor to all valve parts. After the 1 hour reflux, all valves are found free and easy to operate and ammonia pressure has become constant in the methyl chloride condenser. The ammonia is vented to the atmosphere until the autoclave pressure is at atmospheric pressure. Next, the discharge valve is opened and the rotation direction of the agitator is reversed to discharge the toluene-chloride slurry to a steam still pot containing water. The equipmnet is purged with nitrogen until no ammonia is detected at a vent line in the methyl chloride condenser. Agitation and heating are terminated and the equipment is allowed to remain filled with nitrogen. The equipment is now ready for production.

Heat transfer in the methyl chloride condenser, before the ammonia refluxing, is 75.5 cal. per cm.$^2$ per hour and, after ammonia refluxing, heat transfer is 133.4 cal. per cm.$^2$ per hour.

The superiority of the ammonia refluxing over water washing is indicated by the fact that the most effective water washing technique leaves condenser heat transfer at 123.0 cal. per cm.$^2$ per hour. Further, as stated earlier, no equipment drying is required with this ammonia process. Further still, the valves in the lines to pressure sensing units are found freely operable after the ammonia process, where following a water washing, these valves remain difficult to operate. It is, therefore, apparent that valves and lines associated with pressure sensing units are better cleaned by this process then by water washing.

Example 2

Example 1 is repeated with only 45 kg. of ammonia and ½ hour refluxing period. The results are substantially as in Example 1. When the process is repeated with 226 kg. of ammonia, essentially the same beneficial results are obtained.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. In a process for removing solid deposits of ammonium chlorides from components of methylation equipment utilized for manufacture of tetramethyl lead by ammonia or amine catalyzed reaction of methyl chloride and sodium lead alloy, the steps comprising:
   (A) purging said methylation equipment with ammonia vapor to remove any residual gases;
   (B) condensing sufficient liquid ammonia on said components of the methylation equipment to dissolve and loosen substantial portions of said deposits; and
   (C) collecting and removing said ammonia and loosened deposits from the methylation equipment.

2. The process of claim 1 wherein step (B) comprises continually refluxing liquid ammonia from a lower area of said methylation equipment until substantially complete removal of said deposits is effected.

3. The process of claim 2 wherein step (C) comprises collecting deposit-containing liquid ammonia slurry in a lower area of the equipment by gravity return, evaporating and venting off the liquid ammonia and removing the remaining solid ammonium chlorides from the lower area.

4. The process of claim 3 wherein the remaining solid deposits are removed by mechanical means.

5. The process of claim 3 wherein step (C) further comprises adding to the lower area of said equipment a normally liquid hydrocarbon in a quantity sufficient to form a mobile, easily removable slurry with the collected deposits.

6. The process of claim 5 wherein said hydrocarbon is toluene.

7. In a process for removing solid deposits of ammonium chlorides, resulting from an ammonia or amine catalyzed reaction of methyl chloride and sodium lead alloy to form tetramethyl lead, from components of methylation equipment which include an agitatable reactor, charging and discharging lines, methyl chloride condenser, methyl chloride vapor and condensate return lines, flow control valves and process control devices, the steps which comprise:
   (A) purging said equipment with ammonia vapor to remove any residual gases;
   (B) condensing sufficient amounts of ammonia vapor on the deposit-bearing surfaces of said lines, condenser, valves and control devices to dissolve and loosen substantially all of said deposits by continually refluxing liquid ammonia from said reactor;
   (C) collecting the resultant deposit-containing ammonia slurry in said reactor by gravity return;
   (D) evaporating said liquid ammonia from said slurry; and
   (E) removing the remaining solid ammonium chlorides.

8. The process of claim 7 wherein a sufficient quanity of a normally liquid hydrocarbon selected from the group consisting of benzene, toluene, xylene or kerosine is added to the reactor to form a mobile, easily removable slurry with the deposits.

9. The process of claim 8 wherein said reactor is under continuous agitation to granulate collected deposits in order to facilitate their removal.

10. The process of claim 9 wherein graphite is added to said reactor to ease agitation.

References Cited

UNITED STATES PATENTS

| 608,948 | 8/1898 | Barnard et al. | 134—31 XR |
| 1,832,697 | 11/1931 | Freeman. | |
| 2,004,042 | 6/1935 | Eberhardt | 134—11 XR |
| 3,196,046 | 7/1965 | Brite | 134—22 |
| 3,331,943 | 7/1967 | Eff | 134—22 XR |
| 3,419,428 | 12/1968 | Welch | 134—22 |

MORRIS O. WOLK, Primary Examiner

B. S. RICHMAN, Assistant Examiner

U.S. Cl. X.R.

134—31